United States Patent Office 2,797,057
Patented June 25, 1957

2,797,057

PNEUMATIC DISPATCH-TUBE SYSTEMS

Willy Sindzinski, Berlin, and Reinhard Goerlich, Berlin-Schoneberg, Germany, assignors to International Standard Electric Corporation, New York, N. Y., a corporation of Delaware Application November 3, 1953, Serial No. 389,954

Claims priority, application Germany November 3, 1952

8 Claims. (Cl. 243—16)

The invention relates to pneumatic dispatch-tube systems and more particularly to the central or so-called reloading station thereof, that is, a station by which container-type dispatch carriers arriving from dispatch-tubes incoming to the central station are automatically introduced into dispatch tubes outgoing therefrom, these being predetermined, by destination marks on the carriers, to receive them.

The invention has for its object to increase the efficiency of such central stations and makes use of an arrangement wherein an endless conveyor such as a conveyor chain is arranged to afford selective communication between any one of the incoming dispatch tubes and any one of those outgoing from the central, such selectivity being under control of dispatch carriers carrying a distinctive destination mark.

The main feature of the invention is that in addition to this endless conveyor one or more other such conveyors are provided, and that means under control of the dispatch carriers are arranged to transfer these from the first said conveyor to any one of the additional conveyors in order to distribute the incoming carriers over a conveying field larger than that of only one such conveyor, and thereby to add to the capacity of the central. In this way the efficiency of the entire dispatch-tube system will be greater than with a central having only one endless conveyor.

Another feature of the invention is that the endless conveyors in the central are arranged side by side.

These and still other features will be understood from the following description and be particularly pointed out in the appended claims, reference being had to the accompanying drawings in which:

Figure 2:
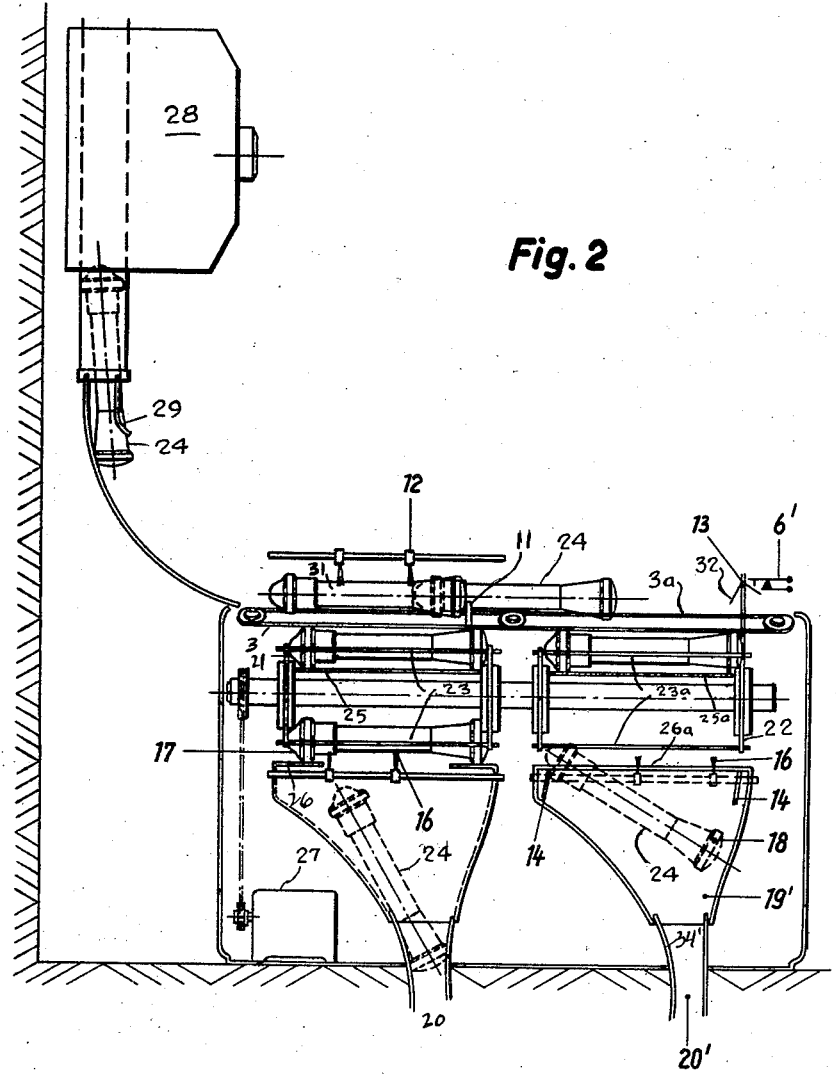
Fig. 2 is a diagrammatic side elevation.
Figure 3:
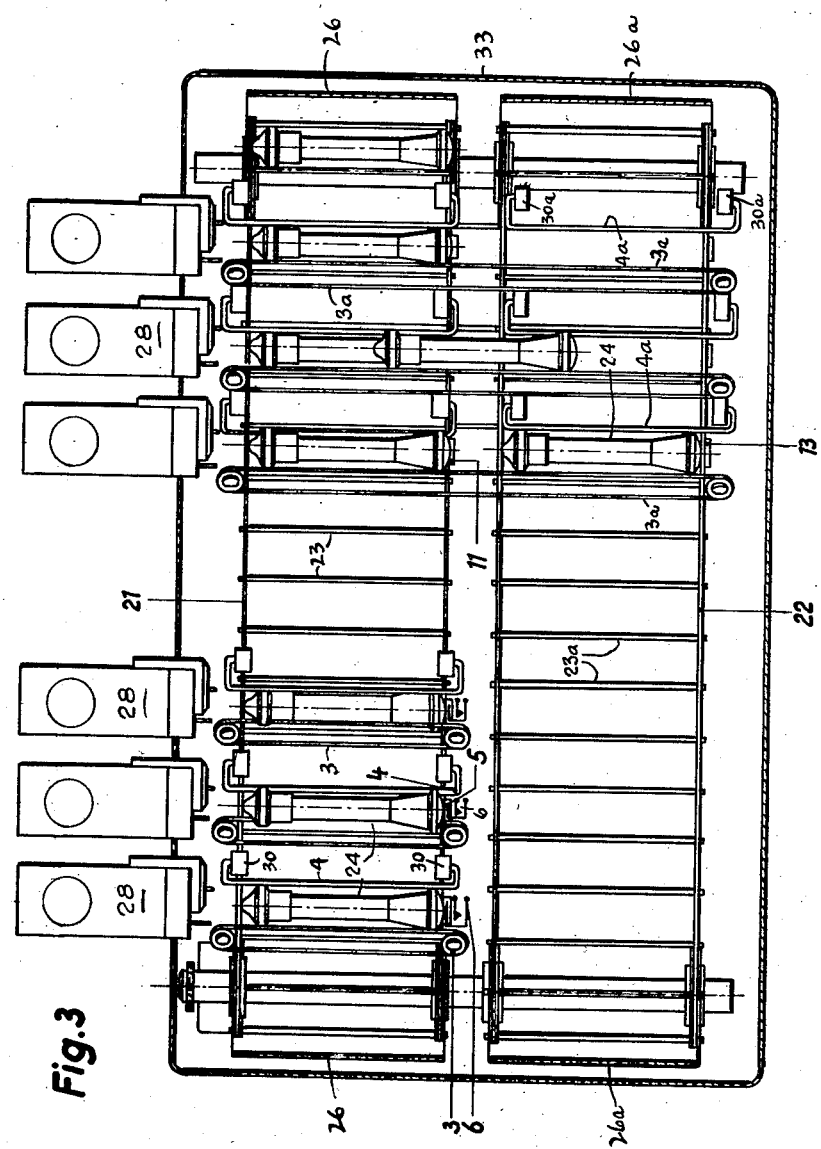
Fig. 3 is a diagrammatic plan view of a central as provided by the invention.

The central or reloading station here shown by way of example comprises two endless conveyor chains 21, 22 arranged side by side as represented in Figs. 2 and 3. The elements of chain 22 are similar to those of claim 21 and are indicated with a corresponding reference numeral supplemental with the letter "a." Each chain has cross-bars 23 between which dispatch carriers 24 can be seated on guide plates 25, 26. The chains are in this way subdivided into sections of which each second one is adapted to accommodate a carrier. 27 denotes a motor for driving the chains 21, 22.

Dispatch tubes 1 and 2 are incoming to the central station. The tubes 1 are for the external traffic. The carriers arriving in them are to be passed into tubes serving the internal traffic. The tubes 2 are internal traffic tubes. The carriers arriving in the tubes 2 can be delivered to either internal or external tubes. The tubes 1, 2 lead each into a spacing device 28 of well known design. Guide rods 29, curved as shown, lead from the devices 28 to the space between a conveyor belt 3, mounted transversely, and a guide bar 4 rotatable in bearings 30. Each of these cross-conveyors 3, 4 is mounted above chain 21 transversely thereof. Cross-conveyors 3a, 4a, similar to those designated 3, 4, are associated with the spacing devices 28 of the tubes 2. Each conveyor 3a, 4a, is mounted above both chains 21, 22. Each spacing device 28 has such a conveyor 3a, 4a, or 3', 4 allocated to it.

For each spacing device 28 a make contact 6 and a break contact 7 are provided. These contacts are under control of the carriers 24.

The contacts 6 are arranged at that end of the appertaining conveyor 3a, 4a, or 3', 4 which is remote from the devices 28. Each contact 6 is thus in the path of any carrier 24 transported by the appertaining cross-conveyor. The contacts 6 are each associated with a stop 5 for the carriers. Whenever a carrier is bearing against stop 5, then contact 6 has been closed. Fig. 3 illustrates this for the two carriers shown on the left whereas for the third carrier there shown the contact 6 is open because this carrier is not resting on conveyor 3, 4 but on chain 21.

Each contact 6 controls an electrical circuit of an electromagnetic relay (not shown), which relay includes a break contact in the operating circuit for the appertaining spacing device 28, so that no carrier shall leave this device as long as another carrier is resting on the respective cross-conveyor 3, 4 or 3a, 4a, contact 6 being closed during that period and the break contact of said electromagnetic relay hence open to render the spacing device ineffective.

Figure 1:
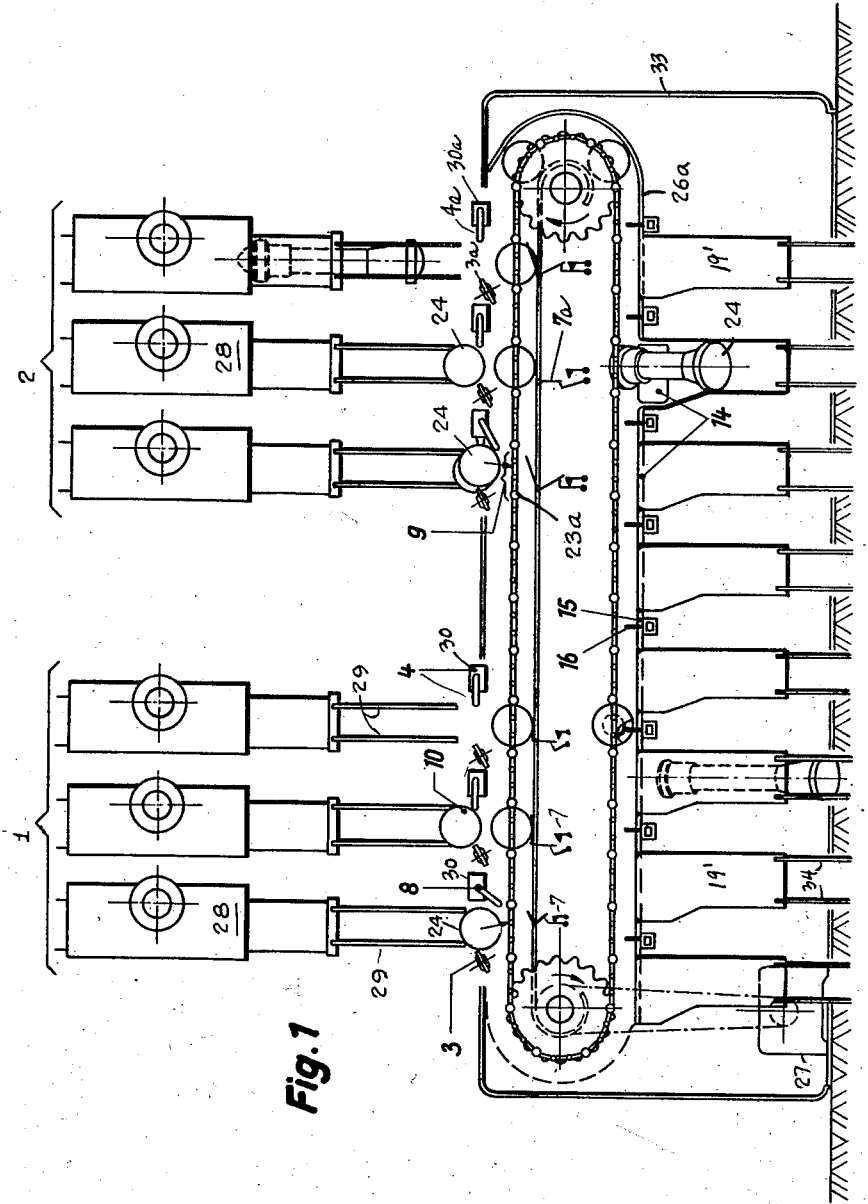
Fig. 1 is a partially sectioned diagrammatic elevation.

The contacts 7 have each an angular lever 7a that projects into the path of the carriers seated in chain 21 and moved by this along plate 25. Whenever a lever 7a has been depressed by a carrier, then the contact 7 under control of this lever is open, as shown in Fig. 1.

The contact 6 for controlling each spacing device 28 is also included in the energizing circuit of an electromagnet (not shown), as is also the appertaining contact 7, these two contacts being connected in series with the winding of said electromagnet. Each guide bar 4 is associated with such a magnet. This magnet when energized acts to rotate the guide bar 4 clockwise away from the carrier resting on conveyor 3, 4 or 3a, 4a, as the case may be as shown in Fig. 1. This carrier then falls onto chain 21, or chain 22 provided that there be no other carrier below it on the chain. If any one of the carriers on the chain has arrived in this position, then the contact 7 pertaining to that contact 6 has been opened by this carrier and thus broken the circuit of the said magnet preventing it from operating. As soon, however, as contact 7 is freed of the traveling carrier it recloses to recomplete the circuit for this magnet, the contact 6 in this circuit being held closed by the carrier on the cross-conveyor. The magnet then operates and turns the guide bar 4 aside and thereby increases the distance between the belt 3 and the guide bar 4 until that distance becomes greater than the diameter of the carrier causing the carrier to drop onto the chain. Contact 6, thus getting rid of the carrier, reopens and thereby deenergizes the magnet, which then returns the guide bar 4 to normal. In Fig. 1, a guide bar 4 which has in this way been turned down is represented at 8. At 9 a carrier 24 is shown as becoming delivered to a chain section defined by two adjacent cross-bars 23. At 10 the chain section facing an arriving carrier 24 has already been occupied by such another.

The cross-conveyors 3, 4 have each a stop 11 in the path of the carriers received by them. The stops 11 are so located that they shall prevent carriers not intended for chain 22 from passing over to it. The stops 11 are so arranged that they can be moved out of their operative position. For instance, they may be rotatable. Each stop 11 has an associated sensing device 12, Fig. 2, associated with it. This device as here shown has two contact brushes adapted to make contact with certain metal rings 31 of the carriers 24 and thereby to complete a circuit for an electromagnet (not shown) adapted to move stop 11 out of its operative position. The carrier will then be conveyed by the respective cross-conveyor 3a, 4a, to chain 22. It will thus be obvious that any carrier intended for chain 22 must have contact rings 31 spaced a certain distance apart, otherwise stop 11 will remain in its upright position and thereby cause the carrier to remain on chain 21. For simplicity, only some of the carriers 24 are shown as equipped with contact rings 31.

Mounted at the end of each conveyor 3a, 4a, are a stop 13, a make contact 6', and an angular lever 32 serving to close this contact. The contacts 6' correspond to the contacts 6 and have break contacts (not shown) associated with them, and which breaks contacts correspond to the contacts 7 before described and co-operate with the contacts 6' in the manner and for the purpose described for the contacts 6, 7.

This central station may be enclosed with a casing 33.

Under each of the chains 21, 22 a row of dispatch tubes 20, 20' are arranged. These tubes are connected by guide rods 34, 34' with funnels 19, 19' which are to take up the carriers arriving on the guide plates 26. Each funnel has two flaps 14 to support the moving carriers 24 as long as the destination mark of these does not agree with the respective test device 16. As soon, however, as the destination mark of a carrier agrees with the test device, an electromagnet, not shown, is excited in order to open the two flaps as illustrated in Figs. 1 and 2, whereupon the carrier falls into the funnel and then into the respective tube 20 or 20' in passing along the guide rods 34, 34'. At 17, a carrier 24 is shown as resting on closed flaps 14, while at 18 a carrier is represented as falling into the funnel associated with tube 20', the flaps 14, associated with tube 20' having been turned downward.

If carriers 24 of the same destination marks are to be delivered to two or more chains such as 21, 22, these carriers need not be introduced into one funnel for all of them but may be delivered from the chains 21, 22 and still others to a conveyor that extends at right angles to these chains. This conveyor then has to transfer the carriers to the outgoing dispatch tube intended to receive all the carriers of the same destination mark.

Each of the conveyor chains 21, 22 and of still others added to them may be driven at a speed different from that of the other chains in order that the carriers supplied to certain desired outgoing tubes may follow upon each other at intervals of time longer than those at which the carriers for other tubes arrive in these, the chain or chains concerned with the latter case having to be driven more speedily than the others.

It is to be understood that, without departing from the spirit of the invention, changes may be made within the scope indicated by the appended claims.

What is claimed is:
1. A pneumatic carrier dispatch tube system comprising a central station having a bank of incoming tubes and a bank of outgoing tubes, main conveyor means disposed between said banks for conveying carriers from said incoming tube bank to said outgoing tube bank, said main conveyor means adapted to move transversely of said tube banks, a plurality of auxiliary conveyor means, each of said auxiliary conveyor means comprising an endless belt and a guide bar in parallel therewith and normally separated therefrom a distance less than the greatest diameter of said carrier, a different one associated with each tube of said incoming bank, each of said auxiliary conveyor means extending transversely of said main conveyor means and adapted to couple its associated tube with said main conveyor means, a first group of carrier discharge means, each coupled to a different one of said auxiliary conveyor means for discharging a carrier therefrom to said main conveyor means, a second group of carrier discharge means, each coupled to a different one of said outgoing tubes for discharging a carrier from said main conveyor means to its associated outgoing tube, separate sensing means associated with the discharge means of each of said groups, each sensing means adapted to control operation of its associated discharge means under control of a characteristic marking of a carrier, and a plurality of additional control means associated with said main conveyor means for rendering ineffective the discharge means associated with said first group when said conveyor is carrying a carrier previously released thereto by an auxiliary conveyor means and said previously released carrier is in register with the auxiliary conveyor means whose discharge means has been rendered ineffective.

2. A pneumatic carrier dispatch tube system as claimed in claim 1, wherein each of the carrier discharge means of said first group comprises means for selectively moving said guide bar away from said endless belt a distance greater than the greatest diameter of said carrier.

3. A pneumatic carrier dispatch tube system as claimed in claim 2, wherein said carrier discharge means further comprises electromagnetic devices for rotating said guide bar in a direction transverse to the direction of movement of said endless belt.

4. A pneumatic carrier dispatch system as claimed in claim 1, wherein said main conveyor means comprises an endless chain having links separated a distance greater than the greatest diameter of a carrier, a fixed track extending parallel to and beneath the first course of said chain, said carrier adapted to roll on said track and guided by a pair of adjacent links of said chain.

5. A pneumatic dispatch system as claimed in claim 4, wherein the discharge means associated with said second group comprises a plurality of pivoted, selectively operable track elements, each normally extending parallel and beneath a second course of said chain and in proximity to the entrance of an outgoing tube, said elements constituting a track when in the unoperated position and a trap door when in operated position.

6. A pneumatic carrier dispatch system as claimed in claim 5, wherein the discharge means associated with said second group further comprises an electromagnetic device for operating said track elements.

7. A pneumatic carrier dispatch system as claimed in claim 6, wherein each of said sensing means is included in a circuit for controlling the electromagnetic devices of both said groups of discharge means.

8. A pneumatic carrier dispatch system as claimed in claim 7, wherein said additional control means comprises switch means coupled to said fixed track, said switch means included in the circuit controlling the electromagnetic devices of said first group of discharge means.

References Cited in the file of this patent

UNITED STATES PATENTS

| | | |
|---|---|---|
| 1,452,280 | Maclaren | Apr. 17, 1923 |
| 1,502,326 | Bauer | July 22, 1924 |
| 1,578,155 | Maclaren | Mar. 23, 1926 |
| 2,374,537 | Goldsmith | Apr. 24, 1945 |
| 2,627,941 | Skillman | Feb. 10, 1953 |
| 2,712,910 | Goerlich | July 12, 1955 |